United States Patent [19]

Tyrell et al.

[11] Patent Number: 4,469,852

[45] Date of Patent: Sep. 4, 1984

[54] COMPOSITION COMPRISING GRAFT POLYCARBONATES

[75] Inventors: John A. Tyrell; Omar M. Boutni; Gary L. Freimiller, all of Mt. Vernon, Ind.

[73] Assignee: General Electric Company, Mt. Vernon, Ind.

[21] Appl. No.: 504,442

[22] Filed: Jun. 15, 1983

[51] Int. Cl.$^3$ .................... C08L 69/00; C08F 283/02
[52] U.S. Cl. ................................. 525/468; 525/539; 528/196
[58] Field of Search .................. 525/468, 67, 539; 528/196

[56] References Cited

U.S. PATENT DOCUMENTS 3,124,554  3/1964  Schnell et al. .................. 525/41
3,462,515  8/1969  Cantrill .......................... 525/468

Primary Examiner—Theodore E. Pertilla
Attorney, Agent, or Firm—Martin B. Barancik

[57] ABSTRACT

This invention relates to novel thermoplastic compositions that are based on an aromatic polycarbonate in admixture with impact modifying quantities of a modified aromatic polycarbonate to which are grafted polymers of a long chain alkenyl compound.

9 Claims, No Drawings

COMPOSITION COMPRISING GRAFT POLYCARBONATES

This invention relates to novel thermoplastic compositions that are based on a modified aromatic polycarbonate that contains alkenyl groups to which are grafted a long chain alkenyl compound in combination with aromatic polycarbonate and providing positive impact modification. In U.S. Pat. No. 3,124,554 a number of thermosettable compositions are disclosed that are based on a modified polycarbonate that contains alkenyl groups to which are grafted long chain alkenyl compounds.

DETAILED DESCRIPTION OF THE INVENTION

The invention provides a novel thermoplastic blend which comprises an aromatic polycarbonate in admixture with an impact improving effective amount of a modified aromatic polycarbonate resin that has units of Formula I, see Formula Sheet for Formula I and all subsequent formulae, wherein $R^1$, $R^2$, $R^3$ and $R^4$ are the same or different and are hydrogen, (lower) alkyl or phenyl; $R^5$ and $R^6$ are (lower) alkenyl; Ph is phenyl; n is at least 30 and m is at least 1; r and s are the same or different and are 0, 1, 2, or 3 provided that r and s are not both zero at the same time; Z is carbon or Z and $R^3$ and $R^4$ or Z and $R^1$ and $R^2$ taken together are S,

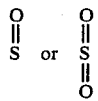

To this polymer is grafted a long chain compound of Formula II, wherein $R^7$ is hydrogen, methyl or ethyl and $R^8$ is alkyl of from about 3 to 20 carbon atoms. $R^8$ is preferably at least six carbon atoms. The grafting occurs under polymerizing conditions so that the compound of Formula II is polymerizing with itself as well as grafting to the modified polycarbonate.

The modified aromatic polycarbonate can be derived from the copolymerization of two different aromatic dihydroxy compounds. One group of these aromatic dihydroxy compounds comprises compounds of Formula III, wherein $R^1$ and $R^2$ are as defined above.

The term (lower) alkyl includes straight and branched hydrocarbon groups having 1 to 6 carbon atoms such as methyl, ethyl, i-propyl, n-hexyl and the like. The term (lower) alkenyl is used to include straight and branched chain beta-alkenyl hydrocarbon groups of from 3-12 carbon atoms such as allyl; 1-methylallyl; 1-ethylallyl; 1-propylallyl; 2-butylallyl and the like.

Included within the scope of compounds of Formula III are:
2,2-bis(4-hydroxyphenyl)propane;
bis(4-hydroxyphenyl)methane;
2,2-bis(4-hydroxy-3-methylphenyl)propane;
4,4-bis(4-hydroxyphenyl)heptane.
Other dihydric phenols which are also suitable for use in the preparation of the above polycarbonates are disclosed in U.S. Pat. Nos. 2,999,835; 3,028,365; 3,334,154 and 4,131,575.

The other dihydroxy compound is of Formula IV, wherein $R^3$, $R^4$, $R^5$, $R^6$, r and Z are as defined above.

Included with the scope of Formula IV are:
2,2-(3,3'diallyl-4,4'-dihydroxydiphenyl)propane;
2,2-(3,3'-di-(2-methylallyl)-4,4'-dihydroxydiphenyl)propane;
2,2-(3,3'-di-(3-propallyl)-4,4'-dihydroxydiphenyl)propane;
2,2-(3,3'-di-(1-methylallyl)-4,4'-dihydroxydiphenyl)propane;
2,2-(3,3'-di-(1-ethallyl)-4,4'-dihydroxydiphenyl)propane;
bis(4-hydroxy-3-allylphenyl)sulfone.

The modified aromatic polycarbonate resins may be prepared by well known polycarbonate forming techniques. These procedures involve the use of diphenyl carbonate, bis-chlorocarbonic esters of aromatic dihydroxy compounds of phosgene in the presence of solvents and/or water and in the presence of hydrogen chloride binding agents and optionally in the presence of catalysts such as tertiary amines.

Resins of the type contemplated as a portion of the admixture of the present invention are described in U.K. Pat. No. 1,152,137; U.S. Pat. No. 3,692,870; U.S. Pat. No. 4,199,540 and Belgian Pat. No. 554,222.

The units of the modified aromatic polycarbonate resin may be selected so that m represents from about 1 to about 15 mole % of the resin.

To these resins are grafted long chain alkenyl compounds such as 2-ethylhexyl acrylate, n-butyl acrylate, n-octyl acrylate n-hexyl methacrylate, n-stearyl acrylate and the like under polymerizing conditions for the alkenyl compound. These conditions are well known and include catalytic quantities of a free radical initiator and elevated temperature.

The grafted aromatic polycarbonate resin of the invention may be made from 5 to 70 parts by weight and more preferably from 40 to 60 parts by weight of the modified aromatic polycarbonate and from 95 to 30 and more preferably from 60 to 40 parts by weight of the polymerized long chain compound of Formula II. All parts by weight are based on 100 parts by weight of the sum of the modified aromatic polycarbonate and the polymerized long chain alkenyl compound.

The grafted aromatic polycarbonate resin is utilized in admixture with unmodified polycarbonates such as those of Formula V, wherein $R^9$ and $R^{10}$ are hydrogen or (lower) alkyl (previously defined) and p is at least 30 or preferably from 40-400.

High molecular weight, thermoplastic, non-grafted aromatic polycarbonates in the sense of the present invention are to be understood as homopolycarbonates and copolycarbonates and mixtures thereof which have a number average molecular weight of about 8,000 to more than 200,000, preferably of about 10,000 to 80,000 and an I.V. of about 0.30 to 1.0 dl/g as measured in methylene chloride at 25° C. These polycarbonates are derived from dihydric phenols such as, for example,
2,2-bis(4-hydroxyphenyl)propane;
bis(4-hydroxyphenyl)methane;
2,2-bis(4-hydroxy-3-methylphenyl)propane;
4,4-bis(4-hydroxyphenyl)heptane;
2,2-(3,5,3'5'-tetrachloro-4,4'-dihydroxyphenyl)propane;
2,2-(3,5,3'5'-tetrabromo-4-4'-dihydroxydiphenyl)propane and;
3,3'-dichloro-4,4'-dihydroxydiphenyl)methane.
Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example by reacting a dihydric phenol with a carbonate precursor such as phosgene in accordance with methods set forth in the above-cited literature and U.S. Pat. Nos. 4,018,750 and 4,123,436 or by transesterification processes such as are disclosed in U.S. Pat. No. 3,153,008, as well as other processes known to those skilled in the art.

The aromatic polycarbonates utilized in the present invention also include the polymeric derivatives of a dihydric phenol, a dicarboxylic acid, and carbonic acid, such as disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

When compositions of the modified aromatic polycarbonate resin are combined with unmodified polycarbonates, those compositions may comprise (a) from about 1 to about 30 parts by weight and preferably from about 10 to about 25 parts by weight of the modified aromatic polycarbonate resin and (b) from about 99 to about 70 parts by weight and preferably about 75 to 90 parts by weight of unmodified polycarbonate resin. All parts by weight of (a) and (b) are parts by weight per 100 parts of the total weight of (a) and (b).

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium and titanate and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 40 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments for reinforcement are made by mechanical pulling. The filament diameters range from about 0.07 mm to 0.2 mm, but this is not critical to the present invention.

By glass fibers, it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths of from about 3.2 mm to about 25 mm long, preferably less than 6.4 mm in length. These are called chopped strands. Some of these binding agents are polymers such as polyvinyl acetate, particular polyester resins, polycarbonates, starch, acrylic melamine or polyvinyl alcohol. Preferably, the composition contains from about 1 to about 30 weight percent of the glass fibers.

Flame retardant amounts of the flame retardants may also be utilized in the composition of the invention in amounts of from 0.5–50 parts by weight of the resinous components. Examples of suitable flame retardants may be found in U.S. Pat. Nos. 3,936,400 and 3,940,366 which are incorporated by reference. Other conventional nonreinforcing fillers, antioxidants, extrusion aids, light stabilizers, foaming agents such as those disclosed in U.S. Pat. No. 4,263,409 and Ger. Offen. No. 2,400,086 which are incorporated by reference and the like may be added to the composition of the invention if desired.

The manner of preparing the molding composition is conventional. Preferably, each ingredient is added as part of a blend premix and the latter is mixed, e.g., by passage through an extruder, or by fluxing on a mill at a temperature dependent on the particular composition. The mixed composition may be cooled and cut up into molding granules and molded into the desired shape.

The term Notched Izod (N.I.) is used herein and in the examples to report the impact strength of the samples, prepared and tested according to ASTM D-256.

PROCEDURE A

To a reactor vessel was added 2135 g. of 2,2′-bis-(4-hydroxyphenyl)propane, 7 liters of methylene chloride, 6 liters of water, 198 g. of bis(4-hydroxy-3-allylphenyl)-sulfone, 37.6 g. of phenol, 14 ml of triethylamine and 3.4 g of sodium gluconate. Phosgene was then introduced into the stirred mixture at a rate of about 36 g. per minute for 37 minutes. During addition of phosgene, the pH is maintained at about 11 by addition of 25% sodium hydroxide solution. After the addition of phosgene is complete, the organic layer and the aqueous layers are separated. The organic layer is washed with dilute hydrochloric acid and with distilled water. The copolymer is steam precipitated and dried. The copolymer was found to have an intrinsic viscosity of 0.455 dl/g as measured in methylene chloride at 25° C.

EXAMPLE 1

To a solution of 70.0 g. of the copolymer, prepared by Procedure A, in 200 ml of cyclohexanone at 120° C. was added 0.1 g. of benzoyl peroxide and 70 g. of freshly distilled 2-ethylhexylacrylate. The reaction mixture was heated to reflux and maintained at reflux for 2 hours. The heat source was removed and the mixture allowed to stand for 16 hours. To the reaction mixture was added 400 ml of methylene chloride and the grafted copolymer was precipitated by pouring the reaction mixture into 2 liters of stirring methanol. The precipitated polymer was filtered and dried. The ir (KBr) showed bands at 1735 and 1775 cm$^{-1}$.

To 75 g. of the modified aromatic polycarbonate resin of Example 1 is added 300 g. of a polycarbonate of 2,2-bis(4-hydroxyphenyl)propane having an I.V. of about 0.46 dl/g as measured in methylene chloride at 25° C. and the blend is injection molded at about 250° C. into test bars that were opaque.

COMPARATIVE EXAMPLE 1

To a solution of 70.0 g. of the copolymer prepared by Procedure A is 200 ml of cyclohexanone at 120° C. was added 0.1 g. of benzoyl peroxide and 70 g. of freshly distilled methyl methacrylate. The reaction mixture was heated to reflux and maintained at reflux for 4 hours. The heat source was removed and the mixture allowed to stand for 60 hours. To the reaction mixture was added 150 ml of methylene chloride and the grafted copolymer was precipitated by pouring the reaction mixture into 2 liters of stirring methanol. The precipitated polymer was filtered and dried.

To 75 g. of the modified aromatic polycarbonate resin of Example 1 was added with 300 g. of a polycarbonate of 2,2-bis(4-hydroxyphenyl)propane having an I.V. of about 0.46 dl/g as measured in methylene chloride at 25° C. and the blend is injection molded at about 250° C. into test bars that were translucent.

COMPARATIVE EXAMPLE 2

Injection molding at about 250° C. of 375 g. of a polycarbonate of 2,2-bis(4-hydroxyphenyl)propane having an I.V. of about 0.46 dl/g as measured in methylene chloride at 25° C. yielded transparent test bars.

TABLE OF RESULTS

| | 6.4 mm/NI kgf cm/cm | 3.2 mm/NI kgf cm/cm |
|---|---|---|
| Example 1 | 42 (ductile) | 52 (ductile) |
| Comparative Example 1 | 4.9 (brittle) | 5.4 (brittle) |
| Comparative Example 2 | 12 (brittle) | 81 (ductile) |

Obviously many variations will suggest themselves to those skilled in the art from the above-detailed description without departing from the scope or spirit of the invention. It is, therefore, to be understood that changes may be made in the particular embodiments of the invention as defined by the appended claims.

FORMULA SHEET

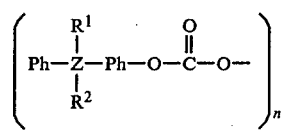

Formula I

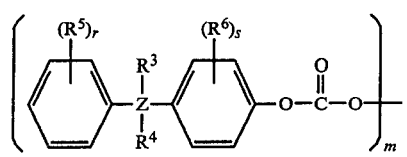

Formula II

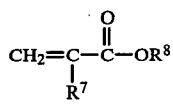

-continued
FORMULA SHEET

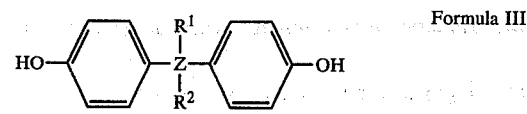

Formula III

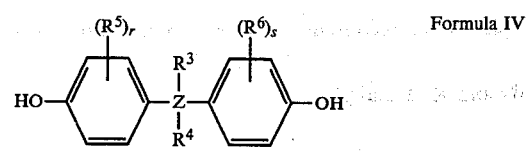

Formula IV

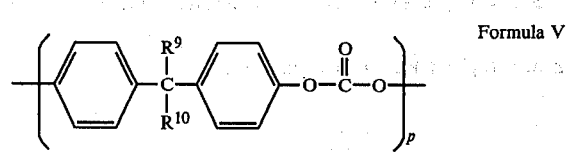

Formula V

What is claimed is:

1. A composition which comprises an aromatic polycarbonate in admixture with an impact improving effective amount of a resin that has units of the formulas:

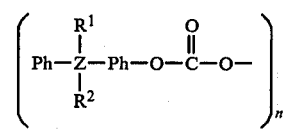

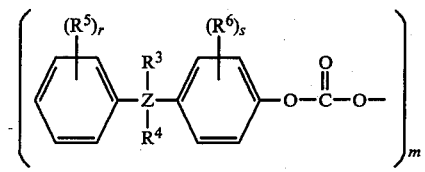

wherein $R^1$, $R^2$, $R^3$ and $R^4$ are the same or different and are hydrogen or (lower) alkyl or phenyl; $R_5$ and $R_6$ are (lower) alkenyl; Ph is phenyl; n is at least 30 and m is at least 1; r and s are 0, 1, 2, or 3 provided that r and s are not zero at the same time; Z is carbon and Z taken together with $R^1$ and $R^2$ or Z taken together with $R^3$ and $R^4$ are S,

to which is grafted a polymer of a compound of the formula:

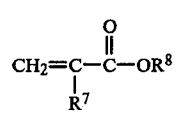

wherein $R^7$ is hydrogen, methyl or ethyl and $R^8$ is alkyl of from 3 to about 20 carbon atoms.

2. A composition in accordance with claim 1 wherein the aromatic polycarbonate is from about 70 to 99 parts by weight of the resinous components.

3. A composition in accordance with claim 2 wherein the aromatic polycarbonate is from about 75 to 90 parts by weight of the resinous components.

4. A composition in accordance with claim 3 wherein $R_5$ and $R_6$ are allyl.

5. A composition in accordance with claim 4 wherein Z and $R_3$ and $R_4$ taken together are

6. A composition in accordance with claim 4 wherein the aromatic polycarbonate is derived from bisphenol A.

7. A composition in accordance with claim 1 wherein the aromatic polycarbonate is derived from bisphenol A.

8. A composition in accordance with claim 2 wherein $R^8$ is from about 6 to about 20 carbon atoms.

9. A composition in accordance with claim 8 wherein $R^8$ is 2-ethylhexyl and $R_7$ is hydrogen.

* * * * *